United States Patent
Vinches et al.

(10) Patent No.: US 10,124,879 B2
(45) Date of Patent: Nov. 13, 2018

(54) AIRCRAFT HAVING IMPROVED UNDER-CABIN SPACE ARCHITECTURE

(71) Applicant: Airbus Operations (SAS), Toulouse (FR)

(72) Inventors: Frederic Vinches, Larra (FR); Bernard Guering, Montrabe (FR)

(73) Assignee: Airbus Operations SAS, Toulouse (FR)

( * ) Notice: Subject to any disclaimer, the term of this patent is extended or adjusted under 35 U.S.C. 154(b) by 217 days.

(21) Appl. No.: 15/133,745

(22) Filed: Apr. 20, 2016

(65) Prior Publication Data

US 2016/0304185 A1 Oct. 20, 2016

(30) Foreign Application Priority Data

Apr. 20, 2015 (FR) ...................... 15 53495

(51) Int. Cl.
  *B64C 1/20* (2006.01)
  *B64D 11/00* (2006.01)
  *B64C 1/10* (2006.01)
  *B64D 9/00* (2006.01)

(52) U.S. Cl.
  CPC .................. *B64C 1/20* (2013.01); *B64C 1/10* (2013.01); *B64D 9/00* (2013.01); *B64D 11/00* (2013.01); *Y02T 50/46* (2013.01)

(58) Field of Classification Search
  CPC .... B64C 1/20; B64C 1/10; B64D 9/00; B64D 11/00; Y02T 50/46
  See application file for complete search history.

(56) References Cited

U.S. PATENT DOCUMENTS

| | | | |
|---|---|---|---|
| 4,984,756 A | 1/1991 | Anders | |
| 6,491,254 B1 | 12/2002 | Walkinshaw et al. | |
| 9,290,259 B2 * | 3/2016 | Durand | B64C 1/00 |
| 2006/0113427 A1 | 6/2006 | Saint-Jalmes et al. | |
| 2009/0152399 A1 | 6/2009 | Laue | |
| 2014/0175223 A1 * | 6/2014 | Durand | B64C 1/068 244/119 |
| 2015/0291281 A1 * | 10/2015 | Burgunder | B64C 1/061 244/129.4 |

OTHER PUBLICATIONS

French Search Report, dated Jan. 14, 2016, priority document.

* cited by examiner

*Primary Examiner* — Valentina Xavier
(74) *Attorney, Agent, or Firm* — Greer, Burns & Crain, Ltd.

(57) ABSTRACT

A cabin space dedicated to passengers and, beneath said cabin space, an under-cabin space which extends along the longitudinal axis of said aircraft. The under-cabin space comprises, distributed along two lines parallel to the longitudinal axis of the aircraft, two sets of systems which are able to carry out functions necessary for the operation of the aircraft. The two lines of sets of systems are disposed respectively in two lateral zones of the under-cabin space which are spaced apart transversely from one another and enclose a free central zone which extends along the longitudinal axis of the aircraft. This arrangement thus eliminates any technical zone from the under-cabin space, thereby facilitating the internal layout and maintenance.

18 Claims, 3 Drawing Sheets

AIRCRAFT HAVING IMPROVED UNDER-CABIN SPACE ARCHITECTURE

CROSS-REFERENCES TO RELATED APPLICATIONS

This application claims the benefit of the French patent application No. 1553495 filed on Apr. 20, 2015, the entire disclosures of which are incorporated herein by way of reference.

BACKGROUND OF THE INVENTION

The invention relates to an aircraft comprising a cabin space dedicated to the passengers and, underneath, an under-cabin space housing systems able to carry out functions necessary for the operation of the aircraft.

Most commercial aircraft comprise a nose housing a cockpit, a tail and, between the two, a central part. This central part situated in the pressurized zone of the fuselage comprises a cabin space dedicated to the passengers and, underneath, an under-cabin space.

The under-cabin space or hold conventionally contains both containers for transporting freight and various systems necessary for performing various functions, for example electrical, electronic and avionic functions (electrical master boxes and associated computers, avionics computers, etc.), aeraulic functions, notably in terms of the air conditioning and ventilation of the various pressurized zones of the fuselage (for the sake of the comfort of individuals and operation of equipment) and hydraulic functions, notably in terms of the distribution of water for the spaces dedicated to restauration and the toilets and to collecting the wastewater from these spaces.

It is known that these systems, or at least some of them, are distributed through the under-cabin space in equipment disposed within various dedicated technical zones, namely:
- a forward main electrical and electronic technical zone situated both in the nose and in the central part,
- a central auxiliary electrical and electronic technical zone situated in the central region of the central part where the wing structure of the aircraft is connected to the fuselage in said central region,
- an aeraulic technical zone situated to the rear of the central auxiliary electrical and electronic technical zone,
- a rear auxiliary electrical and electronic technical zone situated in the rear region of the central part,
- a hydraulic technical zone situated to the rear of the rear auxiliary electrical and electronic technical zone and before the tail.

It will be noted that the principle behind the geographical dispersion of the various technical zones also applies to aircraft in which the wing structure is positioned differently. The siting of these technical zones may therefore vary.

Integrating the various electrical, electronic, aeraulic and hydraulic systems into the equipment of the aforementioned dedicated zones respectively leads to complex installations.

Specifically, this integration needs to take into consideration:
- on the one hand, installation constraints which make it difficult if not to say impossible physically to integrate objects of different shapes and types into a single location, and
- on the other hand, safety constraints which require at least some of the systems to be duplicated by installing two of the same systems as far apart from one another as possible.

Moreover, because of these constraints, the functional connections between the systems (electrical, aeraulic, hydraulic connections) are not optimized in terms of their lengths and complexity.

SUMMARY OF THE INVENTION

It is an object of the invention to propose a new aircraft internal architecture that makes it possible to simplify the integration of the aforementioned systems.

Thus the subject of the present invention is an aircraft comprising a cabin space dedicated to the passengers and, underneath, an under-cabin space which extends along the longitudinal axis of said aircraft, characterized in that the under-cabin space comprises, distributed along two lines parallel to the longitudinal axis of the aircraft, two sets of systems which are able to carry out functions necessary for the operation of the aircraft, the two lines of sets of systems being disposed respectively in two lateral zones of the under-cabin space which are spaced apart transversely from one another and enclose a free central zone which extends along the longitudinal axis of the aircraft, the under-cabin space comprising cabinets disposed in the two lateral zones respectively, the systems of the sets of systems being housed in the cabinets.

Distributing the various systems as two sets of systems housed in cabinets and distributed respectively in two distinct lateral zones situated one on each side of a free central zone (the free central zone is notably reserved to accommodate a plurality of cargo containers aligned one behind the other along the longitudinal axis of the aircraft) affords a simplified under-cabin space architecture.

The local technical zones or bays of the under-cabin space which, previously, were intended to accommodate the various systems in a dedicated manner (e.g.: electrical and electronic zones, aeraulic and hydraulic zones) and dispersed at various (for example longitudinally) spaced-apart positions have been eliminated.

These dedicated and dispersed technical zones are now replaced by two lateral zones, each extending longitudinally (parallel to the longitudinal axis of the aircraft) and grouping together at least some and, for example, most, of the systems able to carry out functions necessary for the operation of the aircraft and which, previously, were in the aforementioned dispersed technical zones.

Concentrating the systems in two parallel lateral zones or lateral volumes makes it possible to rationalize the disposition of the functional (for example electrical, aeraulic and hydraulic) connections connected to the systems and the connections between the systems or between at least some of them.

According to other possible features considered in isolation from or in combination with one another:
- the under-cabin space comprises, in each lateral zone, a lateral space situated between the cabinets of the relevant lateral zone and the fuselage wall opposite, the under-cabin space comprising, in each lateral zone, a set of connections (for example electrical, aeraulic and hydraulic connections) which extends longitudinally along the line of the relevant set of systems, in the lateral space of said lateral zone, each set of connections comprising tappings for connections to said systems;

each cabinet has a front face situated facing the free central zone and a rear face situated facing the lateral space;

the two parallel lines of sets of systems each extend from one end of the under-cabin space to the other;

each of the two parallel lines is locally interrupted at the level of a part of the under-cabin space which is situated at the level of the wing structure of the aircraft (when the aircraft is a low-wing aircraft);

the two parallel lines of sets of systems extend continuously from one end of the under-cabin space to the other;

each lateral zone comprises several cabinets which are aligned with respect to one another along the line of the relevant set of systems so as to form a line of cabinets;

at least some of the cabinets are identical;

each cabinet has a front face situated facing the free central zone and which, when viewed in cross section, is inclined towards the free central zone so that the upper end of the front face is closer to said free central zone than the set-back lower end of said front face;

each cabinet has an upper face and a lower face both adjacent to the front face of the cabinet and configured so as to be as close as possible respectively to the roof of the under-cabin space and to the adjacent wall of the fuselage;

each cabinet has, viewed in cross section, a trapezoidal overall shape;

the free central zone is delimited laterally by the two lines of sets of systems, at its upper part by the roof of the under-cabin space and at its lower part by a floor parallel to the roof;

the free central zone has, viewed in cross section, a polygonal shape formed by joining together two trapeziums which are joined by their respective bases;

the under-cabin space accommodates cargo containers of which the overall cross-sectional shape corresponds to the polygonal overall shape of the free central zone;

the aircraft comprises a nose, a tail and, between the two, a central part which comprises the cabin space dedicated to the passengers and, underneath, the under-cabin space, the central part having a cross section with a geometry that remains constant along its entire length.

BRIEF DESCRIPTION OF THE DRAWINGS

Further features and advantages will become apparent during the course of the following description, given solely by way of nonlimiting example and with reference to the attached drawings in which.

DETAILED DESCRIPTION OF THE PREFERRED EMBODIMENTS

Figure 1:
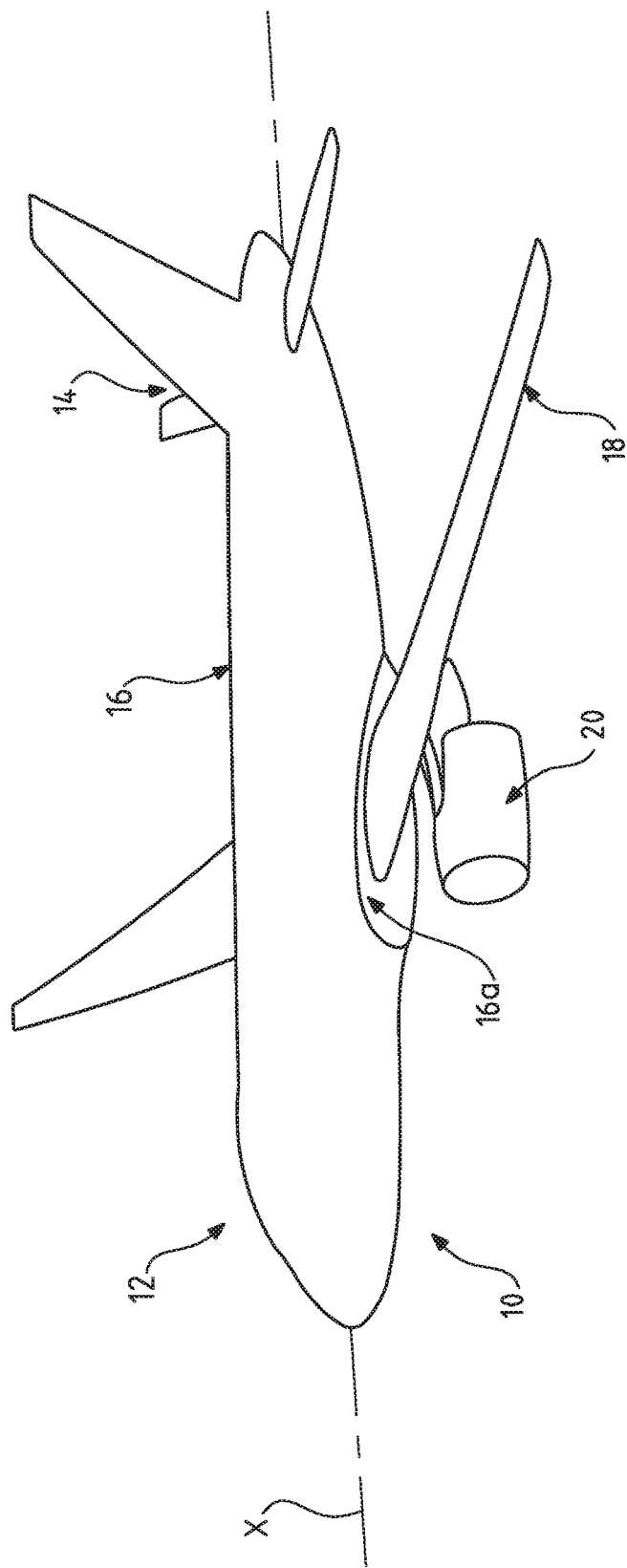
FIG. 1 is a schematic overview of an aircraft according to one embodiment of the invention.

In accordance with one embodiment of the present invention, FIG. 1 illustrates a dispenser, generally indicated at 2 and having a tip structure 4, for mixing at least two separate streams of components into a combined fluid stream, such as a sealant, or tissue sealant or other combined fluid stream. Although the dispensers, systems and methods are generally illustrated and described in the context of a tissue sealant dispenser, it is understood that the present invention is not limited to such a dispenser or to the mixing of tissue sealant components, and that the present invention has applications in a variety of settings where mixing of component fluid streams is desired As shown in FIG. 1, dispenser 2 includes at least two fluid component sources, illustrated in the form of hollow cylinders or barrels 6 and 8, although other source containers from which fluid components are provided may be used. In the embodiment of FIG. 1, each barrel 6, 8 has a generally cylindrical interior or bore in which one of the fluid components such as fibrinogen or thrombin for forming fibrin tissue sealant is stored. The distal end 7, 9, respectively, of each barrel has an outlet port 11, 13, respectively, for communicating with the dispensing tip structure, generally at 4.

FIG. 1 depicts an aircraft 10 which comprises a nose 12, a tail 14 and, between the two, a central part of the fuselage 16. The central part of the fuselage is a zone of the aircraft the cross section of which does not change along its longitudinal dimension, along the longitudinal axis X, whereas the nose and tail are zones the cross section of which changes along the axis X (the geometry of the cross section of these zones varies along the axis X). The aircraft also comprises a central wing structure 18 on which are mounted engines of which just one, denoted 20, is depicted.

Figure 2:
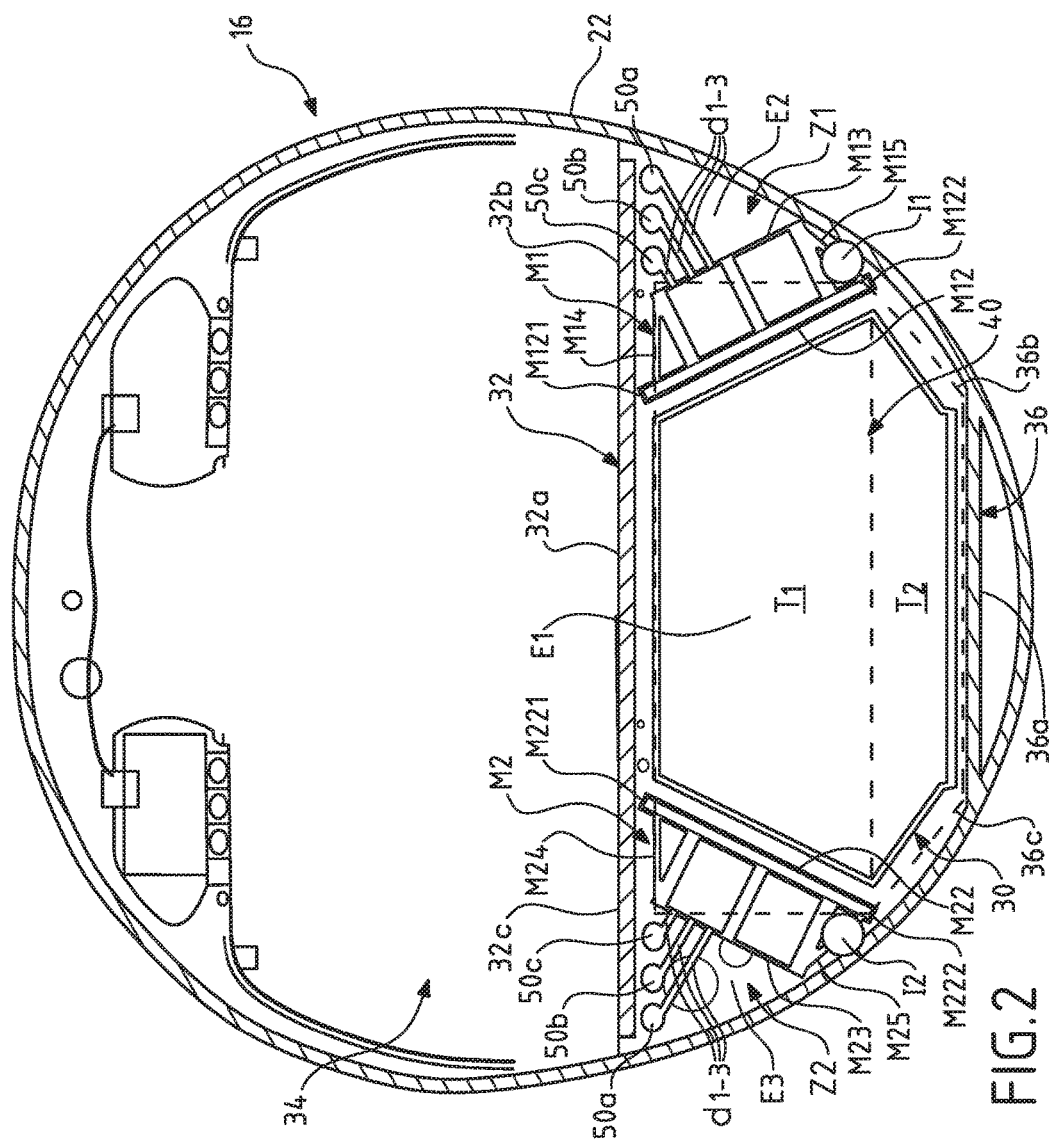
FIG. 2 is a schematic cross section of the aircraft of FIG. 1.

FIG. 2 is a cross section of the central part of the fuselage 16 which, in this embodiment, has a geometry that remains constant over its entire length and is, for example, circular. In this example, the entirety of the central part of the fuselage 16, referred to as the "general section of the aircraft" is therefore itself cylindrical in shape. The figure depicts one frame 22 of the primary structure of the fuselage, it being appreciated that the fuselage comprises, along the axis X, a succession of similar frames parallel to one another and joined together in known manner.

The central part of the fuselage 16 is divided into an upper cabin space dedicated to the passengers (the cabin space comprises a cabin fitted with passenger seats which for the sake of simplicity have not been depicted) and an under-cabin space or hold. The under-cabin space 30 is more particularly situated under a floor 32 of the cabin space or deck 34. The under-cabin space 30 comprises a hold floor 36 formed in the lowermost portion of the cross section and parallel to the floor 32. The floor 32 acts as the roof of the under-cabin space and extends along the entire length of the central part 16 (along the axis X in FIG. 1). The hold floor 36 comprises a horizontal portion 36a, flanked by two symmetric inclined lateral floor portions 36b, 36c which follow the ascending profile of the adjacent walls of the fuselage.

The floor 32 comprises a central portion 32a flanked by two lateral portions 32b, 32c.

As depicted in FIG. 2, two cabinets M1, M2 are mounted in two lateral zones Z1, Z2 respectively situated under the two lateral floor portions 32b, 32c. The lateral zones Z1, Z2 extend longitudinally from one end of the under-cabin space, situated level with the nose, as far as a central zone 16a of the central part 16 (FIG. 1) where the wing structure 18 is connected to the fuselage. The lateral zones Z1, Z2 continue to extend longitudinally, after this interruption due to the zone 16a, as far as an opposite end of the under-cabin space which is situated level with the nose 14 (FIG. 1).

The two lateral zones Z1, Z2 are spaced transversely from one another and flank a longitudinally extending free central zone E1 intended notably to accommodate a plurality of cargo containers arranged along the longitudinal axis of the aircraft, such as the container 40 in FIG. 2.

The cabinets M1 and M2 are disposed facing one another, on each side of the free central zone E1.

Each cabinet has, viewed in cross section, a trapezoidal, for example, overall shape. The trapezoidal overall shape of the cabinet M1 (or M2) is formed, on the one hand, of two large faces M12, M13 (or M22, M23) parallel to one another and, on the other hand, of two small faces M14, M15 (or M24, M25) which are inclined towards one another and adjacent to the large faces. For the purposes of the description that follows, the mutually-parallel large faces M12, M13 (or M22, M23) are referred to as the front and rear faces respectively. The front face M12 (or M22) is the face of the cabinet situated facing the free central zone E1, while the rear face of the cabinet M13 (or M23) is the opposite face situated behind the cabinet with respect to the central zone E1 and facing a fuselage wall opposite.

The cabinets M1, M2 each have their respective front face M12, M22 situated facing the free central zone E1 and inclined towards this free central zone so that the respective upper end M121, M221 of the front face is closer to said free central zone than the set-back lower end M122, M222 of said front face.

The lateral faces M14 (upper face), M15 (lower face), M24 (upper face), M25 (lower face) of the respective cabinets M1, M2 are configured in such a way as to be as close as possible respectively to the lateral floor portions 32b and 32c and to the lower adjacent walls of the fuselage in the under-cabin space 30. The cabinets thus have cross-sectional external contours that as closely as possible, at least in part, follow the contours of each zone Z1, Z2 of triangular cross section.

Figure 3:
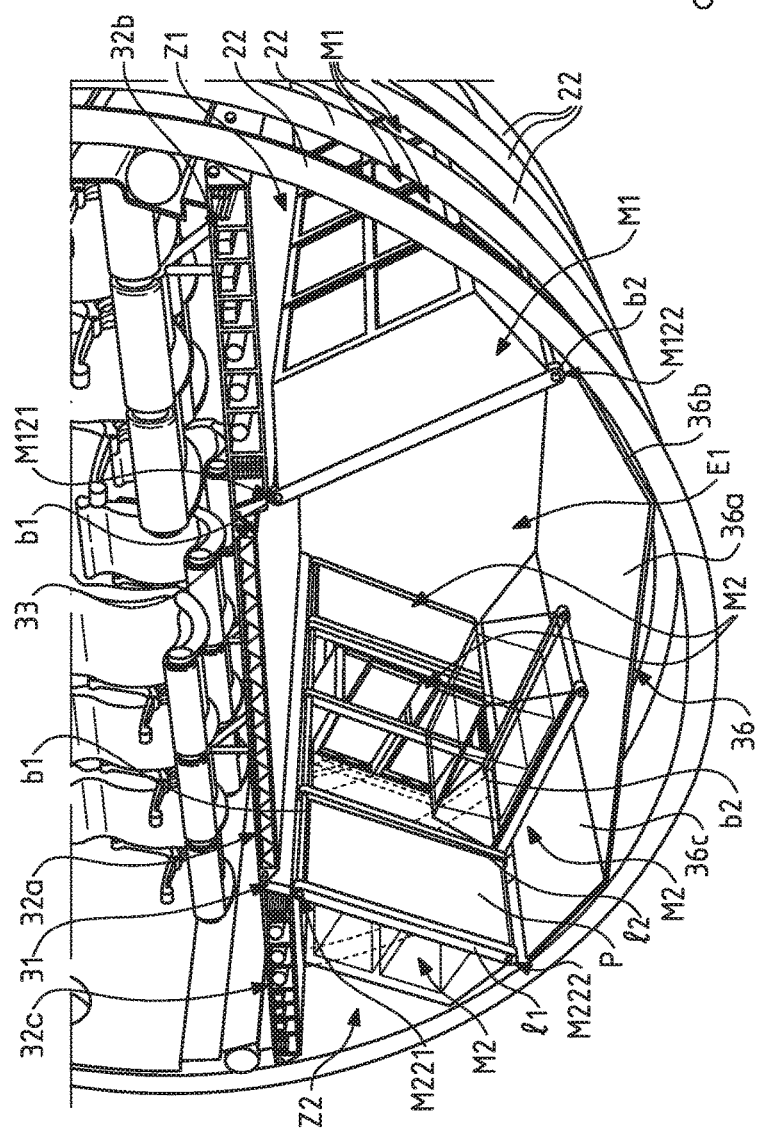
FIG. 3 is a schematic partial perspective view of the cargo hold of FIG. 2.

As depicted in FIG. 3, several cabinets M1 (or M2) are disposed one beside the next each facing the free central zone E1 (these cabinets are disposed one behind the other in a view taken along the longitudinal axis X of the aircraft, namely in one and the same line parallel to the axis X) in the lateral zone Z1 (or Z2) and extend in a line parallel to the axis X. The cabinets of one and the same line of cabinets are disposed adjacent to one another and thus, for example, form a parallelepiped along the entire length of the arrangement. The two lines of cabinets are thus arranged parallel to one another, one on each side of the central zone E1. Each cabinet M1, M2 is fixed by the upper and lower ends of its frontal face M12, M22 respectively to the free end of the lateral floor portion situated above and to a lower edge of the fuselage which is situated below the lateral floor portion, set back from the forward protrusion formed by the end of said lateral portion that is connected to the central portion 32a.

In the embodiment illustrated, the cabinets are all identical and each occupies the same lateral volume. According to an alternative that has not been depicted, the cabinets may differ from one another in terms of shape and in terms of volume.

It will be noted that the floor has been depicted here (FIG. 3) in the form of three distinct floor portions: the central portion 32a, which is not as thick as the lateral portions 32b, 32c that flank it, is fixed to the latter portions at the two opposite ends thereof one of the two free ends of the central portion 32a is fixed to a free end of one of the two lateral floor portions via complementary fixing elements engaged in one another so as to be able to move transversely as the fuselage is pressurized. More particularly, the collaboration between the fixing elements that complement one another forms, on the one hand, an articulated connection 31 between the central portion 32a and the lateral portion 32c and, on the other hand, a connection 40 between the central portion 32a and the lateral portion 32b. The connection 40 is of a kind able to allow possible transverse movement (in the plane of the floor 32, namely here in a horizontal plane) between the two connected portions 32a, 32b. The connection is a sliding connection, for example achieved by a pin capable of sliding inside an oblong hole. This arrangement is beneficial when the fuselage of circular cross section deforms under the effect of pressure. Under the effect of the pressurizing of the fuselage, the assembly of the lateral 32c and central 32a portions connected to one another moves away from the other lateral portion 32b, thereby making it possible not to apply mechanical tensile loadings to the central portion 32a.

The central floor portion 32a is, for example, broken down along the longitudinal axis of the central part of the fuselage 16 into several longitudinal floor segments each of a length that is short in comparison with the overall length of the fuselage central part. The longitudinal floor segments once in position form a continuous central floor portion. It will be noted that the lateral floor portions 32b, 32c may themselves each be produced as a single elongate module of length equal to or less than that of the central part 16.

The free central zone E1 has, in the view of FIG. 2, a polygonal shape which is, for example, formed by joining together two trapeziums T1, T2 which are joined by their respective bases along an imaginary line illustrated in dotted line. The contours of this zone or space follow the profile of the underside of the floor 32, of the front faces of the cabinets M1, M2, of the inclined lateral portions 36b, 36c of the hold floor and of the horizontal central portion 36a.

The under-cabin space 30 thus accommodates cargo containers such as the container 40 the overall cross-sectional shape of which corresponds to the overall polygonal shape of the free central zone E1 so as to occupy all the possible available space.

Figure 4:
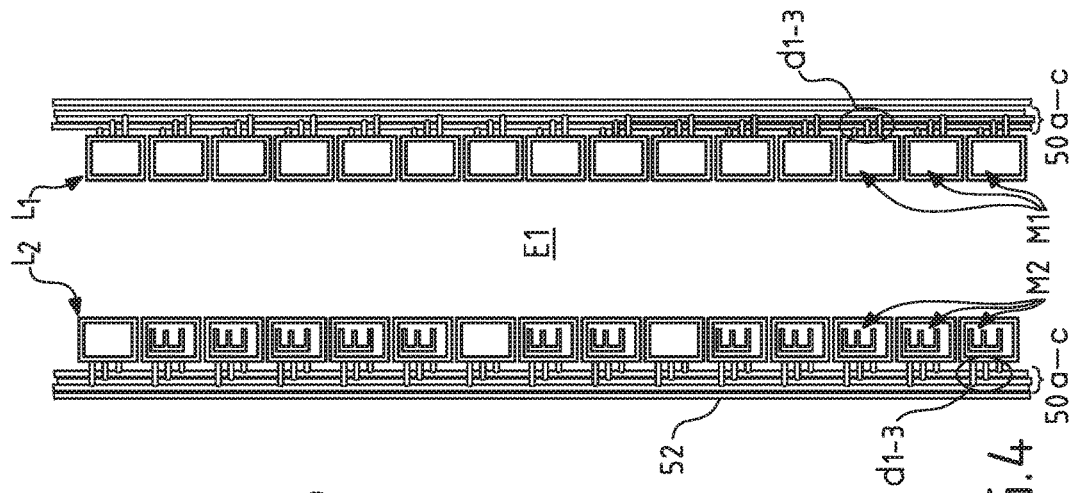
FIG. 4 is a schematic overview showing the two-line architecture of the cabinets of FIGS. 2 and 3.

As depicted in FIG. 3, the front face of each cabinet (such as the cabinets M2) comprises two parallel elongate elements 11, 12 such as connecting rods, flanking a central panel p. The elements 11, 12 are each mounted articulated on top and bottom longitudinal bars b1 and b2, via their opposite ends M121, M122, M221, M222 which are fixed respectively to the underside of the floor 32 and to the interior wall of the fuselage in the under-cabin space 30 using known techniques (the front face of the cabinet thus has two articulations top and bottom). The lower ends M122 and M222 of the cabinets are articulated via articulated connections of known type (clevis, tenon and pin). The upper ends of the cabinets M121 and M221 are themselves articulated in such a way that the articulation can open so that the cabinet can be pivoted downwards as illustrated in FIG. 4. For example, the tenon used for the top articulation of the cabinet is configured in the form of a hook or of a shackle so that it can be opened and closed as required.

The cabinets can be tilted downwards (see FIG. 3 in which one of the cabinets M2 is in a position extracted from its housing and bearing on the central portion 36a) so that various operations can be carried out and, notably, in order to access the lateral space of the lateral zone Z2 situated behind the cabinet.

In the in-service (non-tilted) position, the elements 11, 12 act as oblique load transmitting elements transmitting load between the lateral floor portions 32b, 32c and the lower edges of the fuselage.

The cabinets installed between the lateral floor portions and the bottom part of the fuselage in the under-cabin space 30 are thus capable of supporting said lateral floor portions which rest on these cabinets via the structural members thereof.

Each of the cabinets of the set of cabinets M1, on the one hand, and of the set of cabinets M2, on the other, is able to accommodate systems which are able to carry out functions necessary for the operation of the aircraft. In other words, systems means the set of functions the role of which is to ensure correct operation of the aircraft, outside of the functions connected with the structure of the aircraft and with the passenger cabin. Only the systems integrated into the pressurized fuselage of the aircraft are considered here. These systems include electrical systems (for example, electrical master boxes and their associated components) and/or electronic systems (for example various computers), air conditioning and ventilation systems, systems for distributing and collecting water, and avionics systems.

These systems before were dispersed throughout the cargo hold in specific local technical zones (e.g.: aeraulic zones, hydraulic zones, etc.) which have now been eliminated (front and rear electrical technical zones, air technical zone in a central zone and water technical zone in a rear zone). These zones contained equipment performing a set of functions necessary for the correct operation of the aircraft.

These systems are now grouped together, for example most of them, in the sets of cabinets M1, M2 of the lateral zones Z1 and Z2 which extend along two parallel lines of cabinets facing one another.

As depicted in FIG. 2, arranging the cabinets M1 and M2 (the shape of which has been adapted to suit) in an inclined position in the lateral zones makes it possible to create, between the rear faces thereof and the fuselage wall opposite, a relatively small secondary volume or lateral space E2, E3 of substantially triangular cross section. This lateral space which extends along the lines of cabinets accommodates a set of electrical, aeraulic and hydraulic connections (cables, pipes, etc.) 50a-c necessary for the operation of the systems housed in the cabinets. Tappings d1, d2, d3 allow these connections to be connected to the systems and act as inputs/outputs for the system cabinets. The tappings d1, d2, d3 have either a supply role (supplying power to the components of the system cabinets) or a communications role. Ventilation air interfaces I1, I2 are formed between the lower lateral faces of the cabinets and the adjacent wall of the fuselage (FIG. 2).

FIG. 4 illustrates the two-line row of systems architecture formed in the under-cabin space 30: the two lines of cabinets L1, L2 are as far apart as possible and the sets of electrical, aeraulic and hydraulic connections 50a-c extend along behind the cabinets, along the wall of the fuselage 52, in the lateral spaces mentioned hereinabove. The cabinets flank the central zone E1 intended to accommodate cargo containers with optimized shapes adapted to suit the shape of the central zone left free. The elimination of the dedicated technical bays of the under-cabin space and of their equipment makes it possible to recoup storage volume which is integrated into the cabinets M1 and M2 disposed in the lateral volumes. The volume of the under-cabin space from which the technical bays have been removed (this volume now being uniform) is thus better set out and therefore easier to equip than the zones of the prior art which were difficult to access and complex in shape.

This architecture reduces the length of the connections connected to the systems of the cabinets by comparison with the prior art and makes them simpler to lay out because only sets of longitudinal (rectilinear) system connections associated with tappings are needed. This results in a saving in terms of the on-board mass, in an increase in compactness and in a cost saving.

Because the cabinets M1 and M2 are, for example, all identical, their fixings are the same, making them simpler to install in the under-cabin space and reducing integration time. The systems housed in the cabinets are also easier to connect to the system connections.

The cabinets are capable of integrating systems of different kinds (air, water, electricity) in standardized volumes, thereby affording a certain flexibility of usage.

It will also be noted that maintenance is simpler because access to the systems is obtained only via the under-cabin space, which offers a large volume available to work in (FIG. 3) by comparison with the very confined traditional technical bays. Industrialization is also simplified.

The new layout of the under-cabin space makes it possible to eliminate a large number of components which were directly attached to the structure of the aircraft. This then results in a saving in terms of the on-board mass, in an increase in compactness and in a cost saving.

The cabinets M1 and M2 which house systems and equipment that are identical for the purposes of redundancy are more particularly offset along the longitudinal axis so that they are not situated transversely facing one another. Thus, in the event of an engine blowing, the risks of damage to both of the two identical systems and equipment is greatly reduced. Such a disposition incidentally does not complicate the layout of the systems connections which remain rectilinear.

It will be noted that the separation between the cabinets and therefore between the systems housed in the cabinets already offers greater safety because the redundant systems and equipment are remote from one another (segregated).

In the architecture set out hereinabove, all the elements have been optimized in terms of shape so as to obtain optimum integration and high compactness.

The advantages set out hereinabove apply in general to an under-cabin space in which the systems (previously housed in the technical bays of this space) are distributed through the sets of cabinets disposed in two lateral zones separated from one another by a central zone. Such an overall configuration of the under-cabin space makes it possible to eliminate from this space any technical zone, for example the former cluttered technical bays which were not always easy to access and which generally occupied almost all of the width (cross section) of the aircraft in a given zone and over a certain length (along the longitudinal axis of the aircraft). Access and maintenance are thus easier. The lateral space between the cabinets and the fuselage wall opposite means, for example, that the sets of system connections (e.g., electrical, aeraulic, hydraulic, etc. connections) can be housed there.

According to an alternative that has not been depicted, the two parallel lines of sets of cabinets and therefore of systems extend continuously from one end of the under-cabin space to the other without being interrupted in line with the connection of the wing structure to the fuselage as they were in the embodiment described previously. Such an arrangement is possible in aircraft in which the wing structure is connected to the upper part of the fuselage.

In an alternative form that has not been depicted, the floor is constructed differently and is therefore not necessarily made up of three, two lateral and one central, portions.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft comprising:
a cabin space dedicated to the passengers and,
underneath the cabin space, an under-cabin space which extends along the longitudinal axis of said aircraft,
the under-cabin space comprises, distributed along two lines parallel to the longitudinal axis of the aircraft, two sets of systems which are able to carry out functions necessary for the operation of the aircraft,
the two lines of sets of systems are disposed respectively in two lateral zones of the under-cabin space which are spaced apart transversely from one another and enclose a free central zone which extends along the longitudinal axis of the aircraft,
the under-cabin space comprises cabinets disposed in the two lateral zones respectively, the systems of the sets of systems being housed in the cabinets.

2. The aircraft according to claim 1, wherein the under-cabin space comprises, in each lateral zone, a lateral space situated between the cabinets of the relevant lateral zone and the fuselage wall opposite, the under-cabin space comprising, in each lateral zone, a set of connections which extends longitudinally along the line of the relevant set of systems, in the lateral space of said lateral zone, each set of connections comprising tappings for connections to said systems.

3. The aircraft according to claim 2, wherein each cabinet has a front face situated facing the free central zone and a rear face situated facing the lateral space.

4. The aircraft according to claim 1, wherein the two parallel lines of sets of systems each extend from one end of the under-cabin space to the other.

5. The aircraft according to claim 4, wherein each of the two parallel lines is locally interrupted at a part of the under-cabin space which is level with a wing structure of the aircraft.

6. The aircraft according to claim 4, wherein the two parallel lines of sets of systems extend continuously from one end of the under-cabin space to the other.

7. The aircraft according to claim 1, wherein each lateral zone comprises several cabinets which are aligned with respect to one another along a line of the sets of systems so as to form a line of cabinets.

8. The aircraft according to claim 1, wherein at least some of the cabinets are identical.

9. The aircraft according to claim 1, wherein each cabinet has a front face situated facing the free central zone and which, when viewed in cross section, is inclined towards the free central zone so that an upper end of the front face is closer to said free central zone than a set-back, lower end of said front face.

10. The aircraft according to claim 9, wherein each cabinet has an upper face and a lower face both adjacent to the front face of the cabinet and configured so as to be as close as possible, respectively, to a roof of the under-cabin space and to an adjacent wall of the fuselage.

11. The aircraft according to claim 10, wherein each cabinet has, viewed in cross section, a trapezoidal overall shape.

12. The aircraft according to claim 1, wherein the free central zone is delimited laterally by the two lines of sets of systems, at its upper part by the roof of the under-cabin space and at its lower part by a floor parallel to the roof.

13. The aircraft according to claim 9, wherein the free central zone is delimited laterally by the two lines of sets of systems, at its upper part by the roof of the under-cabin space and at its lower part by a floor parallel to the roof.

14. The aircraft according to claim 13, wherein the free central zone has, viewed in cross section, a polygonal shape formed by joining together two trapeziums which are joined by their respective bases.

15. The aircraft according to claim 13, wherein the under-cabin space accommodates cargo containers of which the overall cross-sectional shape corresponds to the polygonal overall shape of the free central zone.

16. The aircraft according to claim 1, further comprising a nose, a tail and, between the two, a central part which comprises the cabin space dedicated to the passengers and, underneath, the under-cabin space, the central part having a cross section with a geometry that remains constant along its entire length.

17. An aircraft comprising:
a cabin space dedicated to the passengers and,
underneath the cabin space, an under-cabin space which extends along the longitudinal axis of said aircraft,
wherein the under-cabin space comprises, distributed along two lines parallel to the longitudinal axis of the aircraft, two sets of systems which are able to carry out functions necessary for the operation of the aircraft, the two lines of sets of systems are disposed respectively in two lateral zones of the under-cabin space which are spaced apart transversely from one another and enclose a free central zone which extends along the longitudinal axis of the aircraft,
wherein the under-cabin space comprises cabinets disposed in the two lateral zones respectively, the systems of the sets of systems being housed in the cabinets,
wherein the two parallel lines of sets of systems each extend from one end of the under-cabin space to the other, and,
wherein each of the two parallel lines is locally interrupted at a part of the under-cabin space which is level with a wing structure of the aircraft.

18. An aircraft comprising:
a cabin space dedicated to the passengers and,
underneath the cabin space, an under-cabin space which extends along the longitudinal axis of said aircraft,
wherein the under-cabin space comprises, distributed along two lines parallel to the longitudinal axis of the aircraft, two sets of systems which are able to carry out functions necessary for the operation of the aircraft, the two lines of sets of systems disposed respectively in two lateral zones of the under-cabin space which are spaced apart transversely from one another and enclose a free central zone which extends along the longitudinal axis of the aircraft,
wherein the under-cabin space comprises cabinets disposed in the two lateral zones respectively, the systems of the sets of systems being housed in the cabinets, and, wherein each cabinet has a front face facing the free central zone and configured to be opened into the central free zone.

\* \* \* \* \*